Jan. 25, 1972     M. DECKER ETAL     3,637,797
PRODUCTION OF AROMATIC NITRILES
Filed July 19, 1968
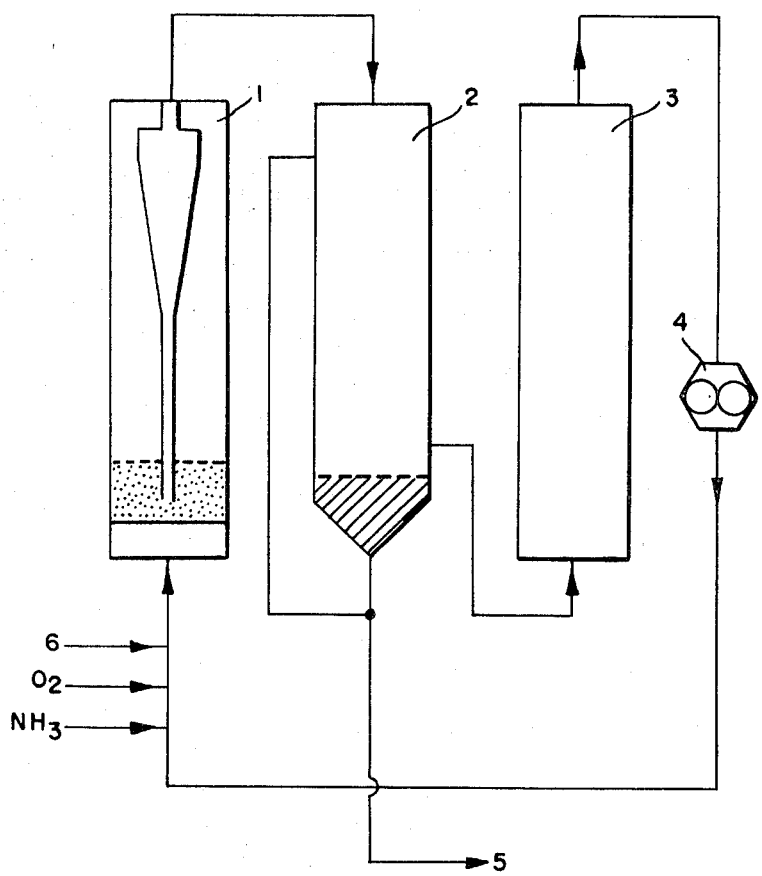
INVENTORS:
MARTIN DECKER
HANNS-HELGE STECHL
CHRISTOF PALM
GERT BUERGER
BY: Marzall, Johnston, Cook, Root
ATT'YS United States Patent Office 3,637,797
Patented Jan. 25, 1972

3,637,797
PRODUCTION OF AROMATIC NITRILES
Martin Decker and Hanns-Helge Stechl, Ludwigshafen (Rhine), Christof Palm, Mannheim, and Gert Buerger, Ludwigshafen (Rhine), Germany, assignors to Badische Anilin- & Soda-Fabrik Aktiengesellschaft, Ludwigshafen (Rhine), Germany
Filed July 19, 1968, Ser. No. 746,076
Claims priority, application Germany, July 19, 1967, P 16 43 630.9
Int. Cl. C07c *121/02*
U.S. Cl. 260—465 C 10 Claims

ABSTRACT OF THE DISCLOSURE

A process for the production of aromatic nitriles, in particular of phthalonitriles, from suitably alkyl-substituted aromatic hydrocarbons by catalytic oxidation with oxygen or oxygen-containing gases in the presence of ammonia at elevated temperature in the vapor phase using an aluminum oxide catalyst activated by metal oxide additives and containing 2 to 10% by weight vanadium (V) oxide, 1 to 10% by weight antimony(III) oxide, 0.02 to 2% by weight alkali metal oxide and, if desired, 0.1 to 4% by weight iron(III) oxide and/or 1 to 8% by weight tungsten(VI) oxide, the catalyst having been obtained by heating aluminum hydroxides or hydrated oxides to temperatures between 600 and 900° C.

The invention relates to a process for the production of aromatic nitriles by reacting alkyl-substituted aromatic hydrocarbons with ammonia and molecular oxygen.

It is known that nitriles of aromatic carboxylic acids are obtained by reacting the corresponding alkyl-substituted aromatic hydrocarbons with ammonia and oxygen in the gaseous phase in the presence of catalysts. Numerous catalysts have been described for use in this reaction, which as active component contain vanadium oxide, to which other metal oxides have been added, e.g. of chromium, tin and molybdenum. The carrier for these catalysts is generally activated alumina.

It has further been recommended to use as catalysts for this reaction solid phosphoric acids which have been activated by the addition of compounds of copper, silver, iron, cobalt, nickel, bismuth, antimony, tin, vanadium, niobium, cerium, chromium, molybdenum and tungsten or mixtures of these compounds. Finally, catalysts are known which contain tungsten as the principal component and the metals magnesium, aluminum, titanium, vanadium, chromium, manganese, iron, cobalt, nickel, copper, zinc, molybdenum, silver, cadmium, tin, tellurium, barium, lead, bismuth, thorium or uranium as promoters.

The selectivity and also the efficiency of the catalysts mentioned is however not very satisfactory. Furthermore, they are preferably used only for hydrocarbon concentrations which do not exceed 2.0 vol. percent of the reaction gas.

An object of the invention is to provide a process for the production of aromatic nitriles, in particular phthalonitriles, from suitably alkyl-substituted aromatic hydrocarbons by ammonia oxidation, in which the catalysts have a higher activity and in particular a higher selectivity than the catalysts hitherto used. Another object of the invention is a process in which further oxidation of the starting hydrocarbons, in particular of xylenes, to carbon dioxide, is considerably diminished and which consequently results in a higher yield in aromatic nitriles, and in which furthermore less ammonia combustion occurs than with earlier processes.

In accordance with this invention, these and other objects and advantages are obtained in a process for the production of aromatic nitriles, in particular of phthalonitriles, from suitably alkyl-substituted aromatic hydrocarbons by catalytic oxidation with oxygen or oxygen-containing gases in the presence of ammonia at elevated temperature in the vapor phase using an aluminum oxide catalyst activated by the addition of metal oxides and containing 2 to 10% by weight vanadium(V) oxide, 1 to 10% by weight antimony(III) oxide, 0.02 to 2% by weight alkai metal oxide and if desired 0.1 to 4% by weight iron (III) oxide and/or 1 to 8% by weight tungsten(VI) oxide, which has been produced by heating aluminum hydroxides or hydrated oxides at temperatures between 600 and 900° C. The nitriles produced according to the invention are valuable intermediates, in particular for the production of dyes.

It has surprisingly been found that optimum yields are obtained in the conversion of the hydrocarbons when longer residence times are used than in earlier processes. Consequently, it is possible to use thicker catalyst beds and thus make the process easier to control. It was also surprising to find that the new catalyst can be used with advantage with high space velocities that is at hydrocarbon concentrations of 1.8 to 5 vol. percent in the reaction gas. Thus substantially smaller apparatus than in earlier processes is needed in the production of aromatic nitriles by the process, with at least equal results.

The aluminum oxide used as catalyst is obtained by subjecting an aluminum hydroxide or hydrated oxide, preferably aluminum hydroxide which obtained in known manner by precipitation with ammonia from sulfuric acid solution, to drying, grinding, tableting and finally to heating, for example for ½ to 2 hours, at a temperature between 600 and 900° C., and preferably between 700 and 800° C. The aluminum oxide thus obtained represents a mixture of several oxides, of which the δ-form predominates.

In addition to aluminum oxide the catalyst contains 2 to 10% by weight vanadium(V) oxide, 1 to 10% by weight antimony(III) oxide, 0.02 to 2% by weight alkali metal oxide and, if desired, 0.1 to 4% by weight iron(III) oxide and/or 1 to 8% by weight tungsten(VI) oxide. The catalyst is particularly active, when it contains 3 to 7% vanadium(V) oxide, 3 to 7% by weight antimony-(III) oxide, 0.1 to 1% by weight alkali metal oxide and, if desired, 0.2 to 2% by weight iron(III) oxide and/or 3 to 8% by weight tungsten(VI) oxide. Suitable alkali metal oxides are the oxides of lithium, sodium, potassium, rubidium or cesium or mixtures thereof, potassium oxide being preferred. The percentages given relate to the analytically determined content of the substances and the substances are not necessarily present as such in the catalyst. It is possible, for example, that they have reacted with other oxides to form salt-like compounds.

In the production of the catalysts, the metal oxides mentioned above can be applied to the aluminum oxide carrier by conventional methods, e.g. by impregnating the carrier with a solution which contains the metal salt in the required amount and drying the impregnated carrier. It is also possible to knead finely divided aluminum oxide powder with metal salt solution to form a paste and to break up the product after drying to form particles of the desired particle size. Antimony is preferably used as ammonium antimonyl tartrate or as antimony nitrate and tungsten is preferably used as ammonium tungstate; vanadium and iron on the other hand are used as oxalates. The alkali metal is suitably used in the form of the hydroxide. Subsequently, the metal salts are converted into the corresponding oxides, e.g. by heating the impregnated aluminum oxide for a period of time, e.g. for 1 to 20 hours, at about 200 to 600° C., preferably at 300 to 450° C. in a current of oxygen-containing inert gas. The oxygen content in the gas mixture suitably comprises from 0.5 to 20 vol. percent, and preferably 2 to 10 vol. percent. The inert gases can for example be nitrogen, carbon dioxide, hydrogen or a mixture of these.

The catalysts are obtained in a particularly advantageous manner by depositing the metal salts on the carrier and decomposing them in a single operation, e.g. by dripping a solution of the metal salts at about 200 to 450° C., preferably at 250 to 350° C., onto a carrier which is maintained in a fluidized state by a current of oxygen-containing inert gas, for example a stream of nitrogen and 0.5 to 15 vol. percent, preferably 8 to 12 vol. percent, oxygen.

The process is carried out under known oxidation conditions.

The starting materials used are benzenes or naphthalenes having one or more alkylsubstituents, suitably benzenes or naphthalenes substituted by up to three alkyl groups. Benzonitrile is obtained from toluene or from ethylbenzene, phthalonitriles are obtained from xylenes. Mesitylene accordingly yields trimesonitrile, alkyl naphthalenes yield the corresponding naphthalene carbonitriles; e.g. 1-naphthonitrile is obtained from 1-methyl-naphthalene and 1,8-naphthalene dicarbonitrile from 1,8-diethylnaphthalene. It is furthermore possible to use alkyl aromatic compounds with longer alkyl side chains, e.g. those with up to four carbon atoms, however the process is then less economical.

The oxygen concentration in the reaction mixture can vary within wide limits. Preferably an excess of oxygen is used, about 1.5 times that of the theoretically required amount. Ammonia is suitably used in excess amount, preferably in an amount which is 1.2 to about 18 times, and in particular 1.2 to 15 times the theoretically required amount. While in the oxidation of monoalkyl aromatic compounds according to the invention ammonia is used generally in amounts of 1.2 to 10 times, and preferably from 1.2 to 5 times, the theoretically required amount, in the oxidation of alkyl aromatic compounds with 2 or more alkyl groups or of alkyl aromatic compounds which already contain a nitrile group, at least 5 moles ammonia, and preferably at least 10 moles ammonia are used per alkyl group to be converted.

The concentration of the alkyl-substituted aromatic hydrocarbon in the mixture of the reactants is suitably from 1.8 to about 12 vol. percent, preferably 1.8 to 5 vol. percent with regard to the total gaseous reaction mixture. It is also possible to carry out dilution with an inert gas, by using for example air as the oxygen-containing gas, or by diluting the gaseous mixture with inert gases, e.g. with nitrogen.

The reaction is suitably carried out at temperatures between 300 and 500° C., preferably between 420 and 480° C. It is recommended to maintain the operating temperature, in particular in the production of o-phthalonitrile, at 430 to 480° C., as with increasing reaction temperature the content of imide and diamide decreases. Thus by using reaction temperatures of, for example, 450 to 480° C., dinitriles with a purity greater than 99.5% are obtained, so that subsequent purification and separation of the imide and diamide is unnecessary.

The residence time or the gas mixture at the catalyst may vary within wide limits, e.g. between 0.1 and 25 seconds, and it is preferably about 0.5 to 5 seconds.

It is possible to use a stationary catalyst or a fluidized bed catalyst. The reaction is suitably carried out at atmospheric pressure. It is however possible to carry out the reaction at slightly elevated pressure, e.g. up to 1.5 atm. gauge, or under slightly reduced pressure, e.g. at 300 mm.

The process can be carried out in a conventional manner, e.g. by passing the gaseous mixture at the reaction temperature over the catalyst, cooling the reaction gases and separating the nitriles by condensation, if desired by spraying with water. On account of the high purity it is frequently not necessary to carry out subsequent purification to remove imides and amides formed.

In the examples that follow, the production of the catalysts is first of all described and then oxidation results obtained by using different catalysts are presented.

(A) THE PRODUCTION OF THE CATALYST

The catalysts are prepared as follows:

(1) The aluminum oxide carrier with a particle size of 0.1 to 0.4 mm., obtained by calcination at 700 to 800° C. of an aluminum hydroxide obtained by precipitation with ammonia from sulfuric acid solution, is impregnated with an aqueous solution containing the relevant amounts of vanadium, antimony and potassium salts, or vanadium, antimony, iron and potassium salts, or vanadium, tungsten, antimony and potassium salts, in accordance with the desired catalyst composition. By determining the water absorbence of the carrier in advance, it is possible to arrange that the entire quantity of impregnation solution is absorbed on the carrier. Vanadium is applied on the carrier in the form of vanadyl oxalate, antimony as ammonium antimonyl tartrate, iron as iron oxalate, tungsten as ammonium tungstate and potassium as potassium hydroxide. The impregnated aluminum oxide thus obtained is then first of all dried at 105° C. and then heated for a period at about 2½ hours at 450° C. and kept at this temperature for about a further half hour while being maintained in a fluidized state by a gas stream consisting of 98 vol. percent of nitrogen and 2% oxygen.

(2) According to another method, the aqueous solution of the metal salts is dripped onto the aluminum oxide carrier, which is maintained in a fluidized state by a gas current containing 90 vol. percent nitrogen and 10% oxygen at a temperature of 300° C. and during a period of about 4 hours, the water being removed as steam. Subsequently, the catalyst which is maintained in a fluidized state is heated for about 30 minutes at 450° C.

A catalyst is thus obtained comprising 5.7% by weight $V_2O_5$, 5.6% by weight $Sb_2O_3$, 0.11% by weight K and 88.59% by weight $Al_2O_3$ by applying an aqueous metal salt solution according to method 1 to 700 g. of the above-described aluminum oxide, the solution being prepared as follows:

37.9 g. antimony(III) oxide and 80 g. tartaric acid are heated in 100 g. water to boiling and subsequently converted into a homogenous solution by the addition of 45 ml. of 25% by weight ammonia. To this is added, with stirring, a solution obtained by heating 39 g. vanadium pentoxide and 100 g. oxalic acid in 100 g. water and finally there is introduced a solution of 1.07 g. potassium hydroxide in 10 g. water. The combined solutions are brought to a volume of 700 ml. with water and are allowed to boil for 1 and 2 minutes.

(3) Instead of from ammonium antimonyl tartrate it is possible to prepare the catalyst from antimony(III) chloride by dissolving the latter in nitric acid. The catalyst having the composition, for example, of 5.5% by weight vanadium pentoxide, 6.0% by weight antimony(III) oxide and 0.2% by weight potassium on alumina is obtained by preparing the following solution and applying it by one of the above-mentioned methods to the catalyst carrier:

50 g. vanadium pentoxide and 120 g. oxalic acid are dissolved by heating in 100 ml. water. Thereupon 85 g. antimony(III) chloride and finally 2.6 g. potassium hydroxide in 50 ml. water are added. The antimony(III) chloride is now brought into solution with 77 ml. of 65% by weight nitric acid while cooling, the solution is diluted to 930 ml. and then used to impregnate 800 g. of carrier material.

(B) PRODUCTION OF THE AROMATIC NITRILES

Example 1

750 ml. of a catalyst having the composition: 5.2% by weight $V_2O_5$, 5.8% by weight $Sb_2O_3$, 0.8% by weight $Fe_2O_3$, 0.25% by weight K and 87.95% by weight $\gamma$-$Al_2O_3$ are placed in a quartz tube ($\phi$=60 mm., length=100 mm.), provided with a fritted quartz base acting as a distribution base and externally heated with an electrical heating coil. The catalyst is heated to 460° C., and there is then added a gaseous mixture containing 2.9% by vol. of o-xylene, 14.5% by vol. of oxygen and 82.6% by vol. of ammonia. After a residence time of 1.2 seconds the gas leaves the catalyst chamber via an alumina filter candle and is cooled cocurrently with an aqueous mash filtrate heated to 70° C. The gas is then led into a second scrubber, where it is freed from the remaining traces of o-phthalonitrile, likewise with the aid of a countercurrent mash filtrate. The coolants are combined in a flask, from which the mash is led via a siphon into a receiver. Here the solid o-phthalonitrile is collected, while the aqueous solution containing ammonia and carbon dioxide is led back to the top of the two scrubbers via a glass suction filter. 110 to 130 l. of mash filtrate is pumped through the apparatus per hour, and is led to both scrubbers in the same proportions. Using 676 g. o-xylene, 653 g. solids with a content of 98.5% o-phthalonitrile are obtained after 6 hours of operation. The yield of o-phthalonitrile is 78.8 mol percent.

Examples 2–7

The operation is as described in Example 1, using the catalysts, starting materials and reaction conditions given in the table. The corresponding aromatic nitriles are obtained in the yields and qualities given in the table.

| Examples | Composition of the catalyst in percent by weight (difference with respect to 100 is content of $Al_2O_3$) | Vol. percent hydrocarbon in the reaction gas | Residence time (sec.) | Molar ratio of hydrocarbon: $O_2$:$NH_3$ | Reaction temperature (° C.) | Yield (mole percent) | Quality (percent) |
|---|---|---|---|---|---|---|---|
| 2 | 7.5 $V_2O_5$; 7 $WO_3$; 3 $Sb_2O_3$; 0.5 K | 2.68 o-xylene | 1.0 | 1:5.8:30.0 | 460 | 82.2 | 96.1 |
| 3 | 5.7 $V_2O_5$; 4.8 $Sb_2O_3$; 0.11 K | 2.06 o-xylene | 1.5 | 1:5.3:35 | 462 | 78.6 | 97.7 |
| 4 | 5.7 $V_2O_5$; 7.0 $Sb_2O_3$; 0.5 K | 5.5 o-tolunitrile | 1.9 | 1:2.6:18 | 465 | 79.8 | 99.3 |
| 5 | 6.5 $V_2O_5$; 3 $Sb_2O_3$; 7 $WO_3$; 0.35 K | 2.98 p-xylene | 1.2 | 1:5.2:27.3 | 455 | 93 | 99.5 |
| 6 | 6.5 $V_2O_5$; 3 $Sb_2O_3$; 7 $WO_3$; 0.35 K | 2.90 m-xylene | 1.2 | 1:5.4:28.1 | 465 | 84 | 99.6 |
| 7 | 6.5 $V_2O_5$; 3 $Sb_2O_3$; 7 $WO_3$; 0.35 K | 10.2 toluene | 2.5 | 1:1.7:1.5 | 465 | 83 | |

Example 8

This example is given with reference to the accompanying drawing

Into a fluidized bed furnace 1 with a diameter of 700 mm. and a length of 5000 mm., made of sheet iron, 200 l. of a catalyst having the composition 5.7% by weight $V_2O_5$, 7% by weight $Sb_2O_3$, 0.4% by weight K and 86.9% by weight $\gamma$-$Al_2O_3$ are introduced, and the catalyst bed is heated to 475° C. 170 m.³ (at S.T.P.) per hour of a gas mixture which consists of 70 vol. percent ammonia and about 30 vol. percent nitrogen are charged into a vaporizer containing 22 kg. o-xylene 6 and are led through the furnace. In addition 19 m.³ (at S.T.P.) oxygen are introduced hourly into the reactor. The reaction gases are lead from the fluidized bed reactor into a product separator 2 in which the o-phthalonitrile is washed out from the hot reaction gases with the aid of an aqueous o-phthalonitrile mash, which is pumped through the apparatus. o-Phthalonitrile is separated from the aqueous mash in a decanter 5. The gas current is then led through a scrubber 3 in order to remove carbon dioxide formed in the reactor and is returned once again to the fluidized bed reactor via a fan 4. In the scrubber there collects in addition to ammonium carbonate solution on average 2.32 kg./h. of a mixture of o-tolunitrile and o-xylene, which is again returned to the reaction zone. 22.3 kg./h. dry product is obtained with a content of o-phthalonitrile of 98.3%, which corresponds to a yield of 82.4 mole percent.

Example 9

750 ml. of a catalyst with a composition of 5% by weight $V_2O_5$, 5% by weight $Sb_2O_3$, 5% by weight $WO_3$ and 0.5% by weight K was used for reacting a gas mixture consisting of pseudo-cumene (1,2,4-trimethylbenzene), oxygen and ammonia in a molar ratio of 1:6.7:35.2 at 465° C. in the reactor described in Example 1. Using the method described in Example 1, there was obtained from 485 g. pseudo-cumene 416 g. of a substance which on thin-layer chromatography was found to consist of about 80% by weight trimellitonitrile with a melting point of 120–123° C. and about 20% by weight of the isomeric compounds 1-methyl-2,4, and 2-methyl-1,4-benzonitrile.

This is a yield of 54% of the theoretical yield of trimellitonitrile and 14.5% of the theoretical yield of the isomeric methylbenzonitriles.

What we claim is:

1. In a process for the production of aromatic nitriles by the catalytic oxidation of benzenes or naphthalenes substituted by up to three alkyl groups of 1 to 4 carbon atoms each with an oxygen-containing gas in the presence of ammonia and at elevated temperature in the vapor phase, the improvement which comprises using as the oxidation catalyst an aluminum oxide activated by the addition thereto of:

(a) 2 to 10% of vanadium (V) oxides;
(b) 1 to 10% of antimony (III) oxide, and
(c) 0.02 to 2% of potassium oxide;

together with the addition of not more than one of the components selected from the group consisting of (d) 0 to 4% of iron (III) oxide,
(e) 0 to 8% of tungsten (VI) oxide, all percentages being with reference to the total catalyst weight and said aluminum oxide having been prepared by heating an aluminum hydroxide or hydrated aluminum oxide at a temperature between 600° and 900° C.

2. A process as claimed in claim 1 wherein the proportions of the metal oxides given under (a) to (c) in the catalyst are as follows:

(a) 3 to 7%; (b) 3 to 7%; and (c) 0.1 to 1%.

3. A process as claimed in claim 2 wherein said catalyst consists essentially of said aluminum oxide together with the activating components (a), (b), (c) and (d) and wherein the proportion of (d) is 0.2 to 2%.

4. A process as claimed in claim 2 wherein said catalyst consists essentially of said aluminum oxide together with the activating components (a), (b), (c) and (e) and wherein the proportion of (e) is 3 to 8%.

5. A process as claimed in claim 1 wherein said aluminum oxide has been prepared by heating an aluminum hydroxide or hydrated aluminum oxide at a temperature of about 700 to 800° C.

6. A process as claimed in claim 1 wherein the aluminum oxide has been prepared by heating said aluminum hydroxide obtained by precipitation with ammonia from a sulfuric acid solution.

7. A process as claimed in claim 1 wherein 1.2 to about 18 moles ammonia is used per alkyl group to be converted.

8. A process as claimed in claim 1 wherein the concentration of the alkyl-substituted aromatic hydrocarbon in the mixture of the reactants is 1.8 to about 12 vol. percent.

9. A process as claimed in claim 1 wherein the reaction temperature is between 300 and 500° C.

10. A process as claimed in claim 1 wherein the residence time is between 0.1 and 25 seconds.

References Cited

UNITED STATES PATENTS

| | | | |
|---|---|---|---|
| 2,833,807 | 5/1958 | Farkas et al. | 260—465 |
| 3,278,573 | 10/1966 | Kroeper et al. | 260—465 |
| 3,355,479 | 11/1967 | Oga et al. | 260—465 |
| 3,395,159 | 7/1968 | Levine | 260—465 X |
| 3,475,350 | 10/1969 | Winnick et al. | 260—465 X |

CHARLES B. PARKER, Primary Examiner

C. F. WARREN, Assistant Examiner

U.S. Cl. X.R.

252—461, 467, 469, 470; 260—465.3

PO-1050
(5/69)

UNITED STATES PATENT OFFICE
CERTIFICATE OF CORRECTION

Patent No. 3,637,797     Dated January 25, 1972

Inventor(s) Martin Decker et al

It is certified that error appears in the above-identified patent and that said Letters Patent are hereby corrected as shown below:

Column 2, line 16, "alkai" should read -- alkali --; line 43, " $\delta$-form" should read -- $\gamma$-form --; line 61, "mem-" should read -- men- --.

Column 5, line 67, "lead" should read -- led --.

Signed and sealed this 27th day of June 1972.

(SEAL)
Attest:

EDWARD M. FLETCHER, JR.
Attesting Officer

ROBERT GOTTSCHALK
Commissioner of Patents